Figure 5:
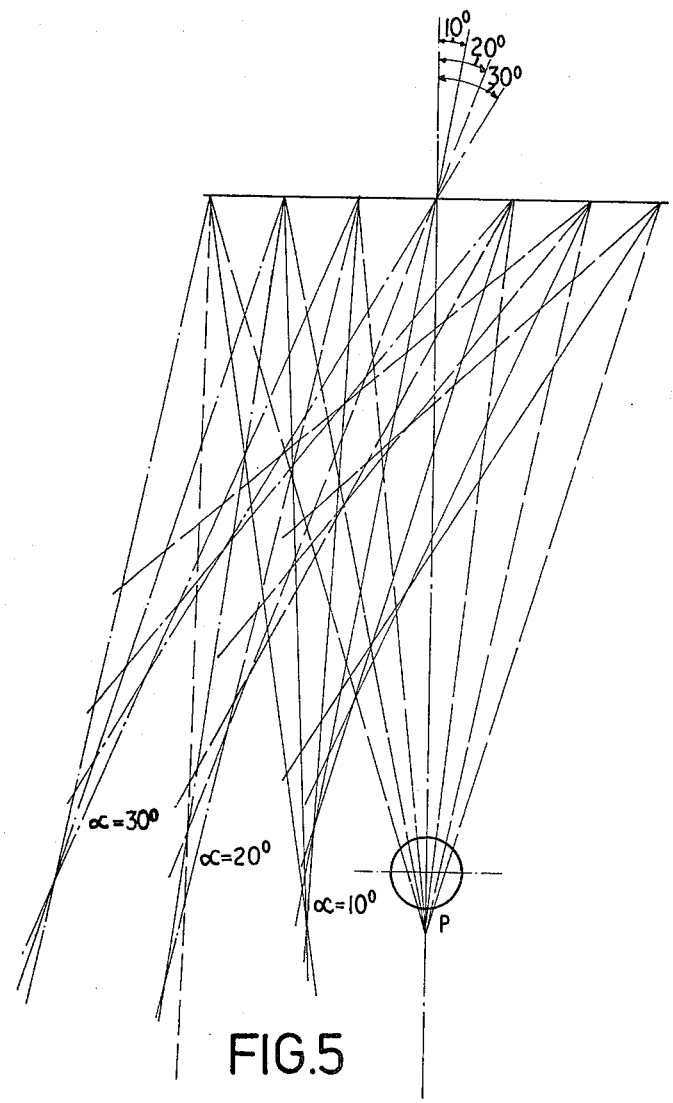

United States Patent [19]

Szulmayer

[11] 4,230,094

[45] Oct. 28, 1980

[54] SOLAR CONCENTRATOR

[75] Inventor: Wally Szulmayer, Burwood, Australia

[73] Assignee: Unisearch Limited, Australia

[21] Appl. No.: 656,945

[22] Filed: Feb. 10, 1976

[30] Foreign Application Priority Data

Feb. 13, 1975 [AU] Australia .................. PC0596

[51] Int. Cl.³ .............................................. F24J 3/02
[52] U.S. Cl. .................................... 126/439; 126/440
[58] Field of Search ............... 126/270, 271, 439, 440

[56] References Cited

U.S. PATENT DOCUMENTS

| | | | |
|---|---|---|---|
| 735,321 | 8/1903 | Walker | 126/271 |
| 748,696 | 1/1904 | Browning, Jr. | 126/271 |
| 842,788 | 1/1907 | Huntoon | 126/271 |
| 937,013 | 10/1909 | Severy | 126/271 |
| 1,004,888 | 10/1911 | McIntyre | 126/271 |
| 1,130,871 | 3/1915 | Willsie | 126/271 |
| 1,258,405 | 3/1918 | Harrison | 126/271 |
| 1,683,266 | 9/1928 | Shipman | 126/271 |
| 2,277,311 | 3/1942 | Freeman | 126/271 |
| 2,920,710 | 1/1960 | Howard | 126/270 |
| 3,125,091 | 3/1964 | Sleeper, Jr. | 126/271 |
| 3,152,442 | 10/1964 | Rowekamp | 126/271 |
| 3,923,039 | 12/1975 | Falbel | 126/270 |
| 3,968,786 | 7/1976 | Spielberg | 126/270 |

FOREIGN PATENT DOCUMENTS 131069  1/1949  United Kingdom ............. 126/270

Primary Examiner—John J. Vrablik
Attorney, Agent, or Firm—Holman & Stern

[57] ABSTRACT

A solar radiation concentrator consisting of a refractor in the form of at least one strip of transparent material having on it a pattern of prismatic parallel grooves arranged to refract incident solar radiation onto a trough shaped reflector the opening of which is closed by the said strip, a linearly extending target being arranged within the reflector parallel to the axis of the said strip, the strip and the concentrator having optical properties such that in combination the concentration of solar radiation of the target is maximized so as to permit stationary operation of the concentrator without sun-tracking or seasonal orientation.

5 Claims, 7 Drawing Figures

U.S. Patent  Oct. 28, 1980  Sheet 1 of 3  4,230,094
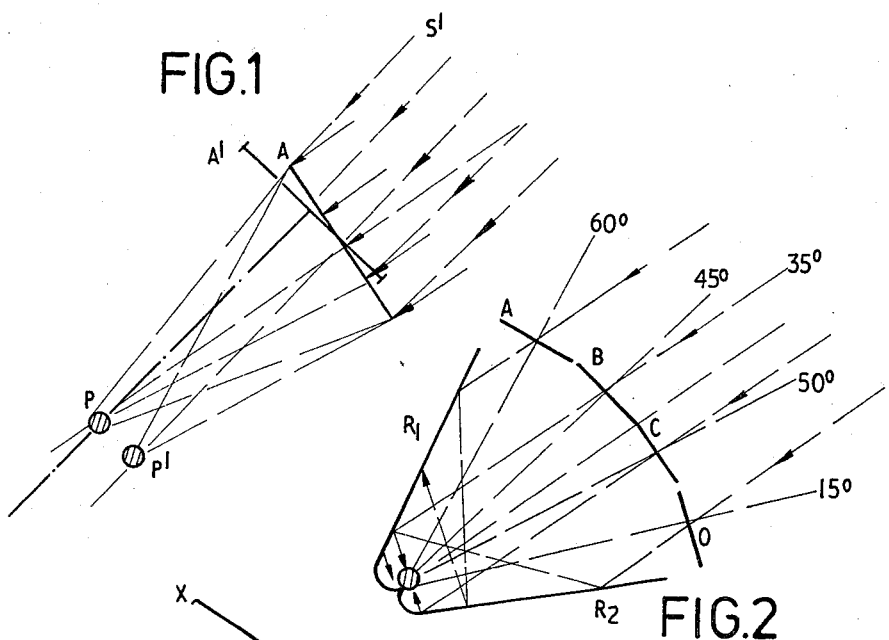
FIG.1
FIG.2
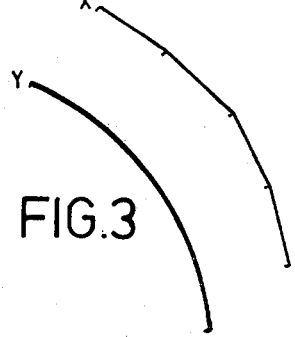
FIG.3
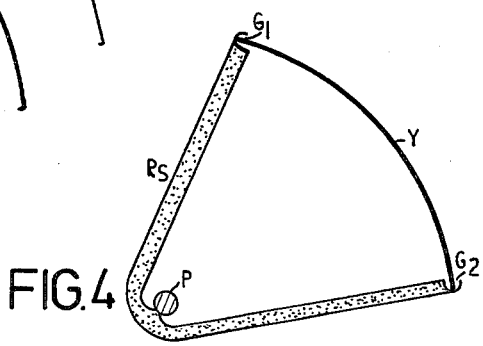
FIG.4

SOLAR CONCENTRATOR

The present invention relates to a device for concentrating solar radiation by focussing on a linear target.

In a paper printed in Solar Energy (1973) Vol. 14 pp 327-331 the present inventor describes a solar concentrator capable of focussing solar heat on a linear target, for example a rod or a water pipe. The concentrator consists of a transparent plastic strip having on it a pattern of prismatic parallel grooves and ridges to produce the required beam refraction, in order to focus solar heat.

The main drawback of all solar concentrators built in the past is the need for sun-tracking i.e. continuous or periodic re-orientation to follow the movement of the sun.

The object of the present invention is to provide a solar concentrator which is capable of operating in a stationary, permanently fixed, position and does not require re-orientation as the sun moves.

The present invention proposes the use of an assembly of one or several refracting elements, such as the concentrator strip, described in the attached reprint, cylindrical Fresnel lenses, or similar devices in conjunction with a reflector trough of suitable form surrounding a linearly extended target such as a pipe.

The present invention consists in a solar radiation concentrator consisting of a refractor in the form of at least one strip of transparent material having on it a pattern of prismatic parallel grooves arranged to refract incident solar radiation onto a trough shaped reflector the opening of which is closed by the said strip, a linearly extending target being arranged within the reflector parallel to the axis of the said strip, the strip and the reflector having optical properties such that in combination obliquely incident solar radiation incident at angles up to 30° from the normal is focused on the target so as to permit stationary operation of the concentrator without sun-tracking or seasonal orientation.

Figure 6:
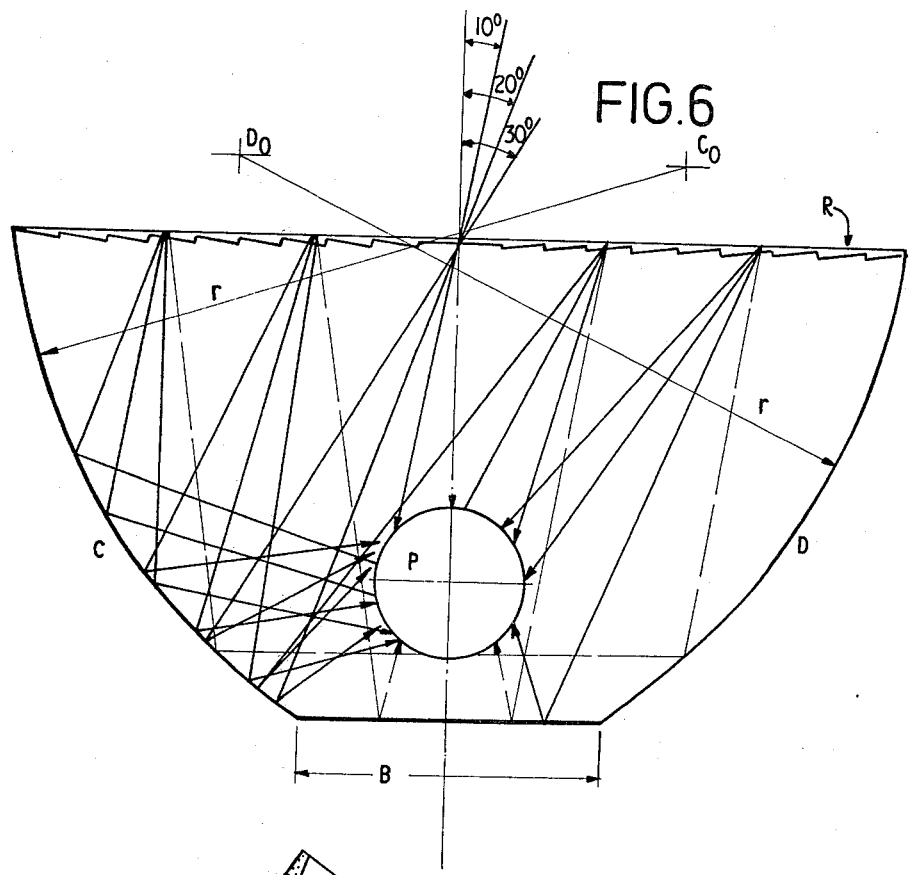
Figure 7:
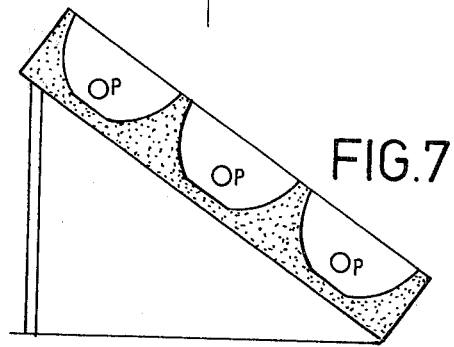

In order that the invention may be better understood and put into practice preferred forms thereof are hereinafter described, by way of example with reference to the accompanying drawings in which:

FIG. 1 illustrates the mode of operation of a single strip concentrator,

FIG. 2 illustrates the mode of operation of a multiple concentrator combined with a reflector according to the invention, FIG. 3 illustrates different arrangements of concentrator strips, FIG. 4 illustrates a combined refractor-reflector concentrator system according to the invention, FIG. 5 illustrates the mode of operation of a single strip concentrator at perpendicular and oblique radiation incidence, FIG. 6 illustrates a form of the invention using a single concentrator strip in conjunction with a suitable reflector, and FIG. 7 illustrates an application of the form of the invention of FIG. 6.

FIG. 1 illustrates how a single strip concentrator produces the required refraction of solar radiation to focus on a linear target P for example a water pipe. For maximum efficiency the strip should be facing the solar beam perpendicularly. Oblique incidence of solar radiation will shift the focal line to P′ away from the target pipe P. Therefore when the sun moves across the sky say to position S′ the strip must be readjusted to A′.

However if four strips are fixed permanently in positions indicated in FIG. 2 the target will be in focus of the strips A, B, C and D when the sun reaches the altitude angles of 60°, 45°, 30°, 15° respectively. When the sun passes through intermediate positions, suitably oriented reflecting walls $R_1$ and $R_2$ will ensure focussing from adjoining strips with minor contributions from strips facing the sun at more acute angles.

When the sun's altitude is, for example, 35° the target will receive radiation refracted by the strip C and reflected from $R_2$ as well as radiation refracted by B and reflected from $R_1$. Strips A and D which are oriented at oblique angles to the beam will focus at some distance away from the target but some fractions of the refracted radiation can still be reflected to hit the target.

The strips A, B, C, D can be mounted separately or they can be joined to form one curved refractor with a shape similar to X, or Y as in FIG. 3. Similarly as shown in FIG. 4 one reflector shell Rs can be produced, with suitable grooves $G_1$ and $G_2$ at the top to accomodate the refracting strip. Thus the full assembly will form an integrated structure enclosing the target P.

FIG. 5 illustrates focussing of solar radiation by a single cylindrical strip concentrator or Fresnal lens at normal and oblique radiation incidence. A pipe P located in the focal area of the strip, will receive all radiation passing perpendicularly through it. At oblique radiation incidence (when $\alpha = 10°$, 20° or 30°), the focal area spreads out into caustic surfaces and shifts away from the target pipe P to positions $P_{10}$, $P_{20}$, $P_{30}$ respectively.

Cylindrical mirrors with parabolic or circular profiles produce a similar pattern of caustic surfaces which spread out and shift away from the axis as the angle of incidence increases. Some small deviation from normal incidence ($\Delta\alpha < 10°$) can be tolerated by reflectors of low concentrating power (of the order of 2–3) which permits their operation in a semi-stationary mode i.e. with periodic re-orientation (daily, weekly or monthly) instead of continuous sun-tracking.

By the simultaneous use of a refracting element (strip concentrator or cylindrical Fresnal lens) with a suitable reflecting trough and with proper matching of the two optical elements a sufficient tolerence to oblique incidence can be achieved to permit fully stationary operation of a cylindrical concentrator during the whole year without sun-tracking or seasonal re-orientation.

FIG. 6 illustrates a simple form of the invention. The concentrator consists of a refracting strip R and a reflector trough compounded from a planar base B and cylindrical side segments of circular profiles C and D, with off-set centres Co and Do respectively. As is evident from the figure that relatively simple arrangement concentrates oblique radiation within an incidence angle of $\alpha \pm 30°$ on the absorber pipe P after refraction by R and a single reflection from C or D.

Profiles of reflectors compounded from more elaborate arcs (elliptical, spiral, parabolic or suitable involutes) and appropriate bases (rounded, pointed or inverted) can be used with refractors of different designs to achieve higher concentration ratios and/or higher tolerances to oblique incidence. For optical performance in specific operating conditions the reflector must be matched with the refractor, or preferably both elements designed together. A concentration factor of 6 (=ratio of reflector aperture to pipe diameter) is shown in FIG. 6, but higher values up to 10-15 are considered feasible, with focussing tolerances of Δα=±30 or ±20 respectively. For some applications two absorber pipes aligned vertically or horizontally are advantageous, as they permit inlet and outlet connections to be located near-by.

For optimal performance the reflector shall be tripartite having two side portions arranged symmetrically on either side of the target, which may be planar, arcs of circles or other curves and a bottom portion beneath the reflector joining the other two but of different form and curvature. This may be planar (as in FIG. 6), cusped (as in FIG. 2) or of some other curved form. The precise configuration of the reflector is chosen to match the optical characteristics of the refractor to maximise concentration on solar radiation of the target. A configuration such as that shown in FIG. 6 has the advantage of being shallower and more compact than those shown in FIGS. 2 and 4.

It is worth stressing that a focussing tolerance of Δα=±30°, which is equivalent to an admission angle of 60° is sufficient for stationary operation of a concentrator in all seasons in Sydney - Lat 34 S, where the zenith angle of the sun at summer solstice is 79°. A concentrator having its horizontal axis oriented east-west and the vertical axis inclined at 49° to the horizontal can operate efficiently at sun altitudes ranging from 19° to 79°. At sun altitudes below 20° the amount of heat reaching the earth is negligible anyway and can be disregarded for practical purposes. In most European and North American insolation conditions (Lat 40°-50°N) where the sun altitude never exceeds 60-65° a focussing tolerance of 20-25 would be adequate. The cylindrical concentrators can be used as single continuous long troughs for fixing to walls, balconies or awnings or they can be pre-assembled into modules of suitable size, convenient for transport and installation.

FIG. 7 shows an example of a stationary unit comparable in size to a flat plate absorber (48" long, 30" wide and 6" deep) yet capable of heating fluids to higher temperature more efficiently at lower capital costs.

Whereas a single pipe target is shown in the figures referred to above a multiplicity of parallel target pipes may be used arranged near the focus of the refracting element, the pipes being arranged to be switched thermostatically as the main concentration of solar radiation moves with movement of the sun.

This invention has several practical advantages:

(a) As the concentrator remains stationary, the elimination of movable supports and gears, as well as electronic tracking and control systems constitutes obvious mechanical and economic advantages.

(b) The sealed refractor-reflector enclosure illustrated in FIGS. 4 and 6 reduces heat losses of the target, by eliminating the effect of wind.

(c) The reflecting surfaces $R_s$ and selective absorber surface of the target P is protected from dust and rain. The smooth external surface can be made self-cleaning to some extent by wind and rain.

Inexpensive and readily available materials can be used e.g.:

(a) Plastics (acrylics) or glass for the refractor strips.

(b) Aluminium, galvanised iron sheet, or polystyrene foam with suitable reflecting adhesives for the reflector.

Suitable lengths of 1 or 2 meters of refractor and reflector strips can be mass-produced by extrusion or compression moulding. The provision of self-locking edges along the ends will ensure quick assembly into continuous lengths or glass refractor strips can be joined by metal strips, or silicone sealant.

APPLICATIONS

The stationary concentrator provides an inexpensive tool for up-grading the low intensity solar heat to temperatures of 100°14 130° C. Access to that temperature range, which cannot be reached by flat plate absorbers (operating at 55°-60° C.) opens the way to many industrial and domestic applications of solar energy:

1. Water heating and production of high pressure stream. The geometry of continuous, relatively light concentrator strips permits considerable flexibility in arrangement and mounting. While the heavy flat plate type absorbers have to be located on roofs, or on the ground and require strong supporting frames, the lightweight and aesthetically inoffensive strip concentrators can be attached to walls, awnings and balconies. Thus domestic water heaters can be installed even by flat dwellers, industrial solar heaters can be accomodate D on vertical structures - shed, or factory walls.

2. Absorption refrigeration and air conditioning.
3. Thermoelectric power generation.

I claim:

1. A solar radiation concentrator comprising:
   trough means, having an open portion, for reflecting solar radiation incident thereupon;
   refracting means, covering said open portion of said trough means, for refracting solar radiation incident thereupon onto said trough means, said refracting means comprising at least one strip of transparent material including a pattern of prismatic parallel grooves; and
   target means, linearly, extended in said trough means parallel with a longitudinal axis of said strip means, for absorbing solar radiation refracted and reflected thereupon by said refracting means and said trough means, respectively, said trough means including at least two side portions, each of said side portions is a circular curved reflective portion with a center of curvature offset from a center of curvature of the other side portion, and a substantially flat bottom portion, said side portions in combination with said refracting means facilitating the focussing of solar radiation, incident at angles up to 30° from a normal to said refracting means, upon said target means so as to permit stationary operation of said concentrator without sun-tracking or seasonal orientation.

2. A solar radiation concentrator as claimed in claim 1 wherein the trough means is shaped in section so as to have two side portions arranged symmetrically on either side of the target joined by a bottom portion, passing beneath and spaced from the target, of a different form from the side portions.

3. A solar radiation concentrator as claimed in claim 1 wherein said strip is secured in grooves formed along upper edges of said trough means to form an integrated structure enclosing the target.

4. A solar radiation concentrator as claimed in claim 1 wherein said refracting means comprises a plurality of said strips side by side arranged at different angles to focus on the target at different altitudes of the sun.

5. A solar radiation concentrator as claimed in claim 4 wherein said strips are curved to form a continuously curved refractor.

* * * * *